(No Model.)

J. GIBBONS.
SNAP HOOK.

No. 249,333.

Patented Nov. 8, 1881.

Witnesses:
Chas. J. Byington
Edward E. Paul

Inventor:
JNO. GIBBONS,
by
William H. Low.
Attorney.

UNITED STATES PATENT OFFICE.

JOHN GIBBONS, OF WEST TROY, ASSIGNOR OF TWO-THIRDS TO CHARLES R. HICKS AND JOHN H. REYNOLDS, BOTH OF TROY, NEW YORK.

SNAP-HOOK.

SPECIFICATION forming part of Letters Patent No. 249,333, dated November 8, 1881.

Application filed July 13, 1881. (No model.)

*To all whom it may concern:*

Be it known that I, JOHN GIBBONS, of West Troy, in the county of Albany and State of New York, have invented certain new and useful Improvements in Snap-Hooks, of which the following is a specification.

My invention relates to improvements in snap-hooks for halters, &c.; and it consists in constructing such devices with a main or hook-bearing portion provided with a cylindrical body or stem having a recess for containing a spring, and adapted to receive a sliding piece fashioned to form a complement to the hook, and produce, in conjunction with said hook, an eye or link, said sliding piece being held in place on the exterior of the stem of the hook by means of clasping arms or clips and forced outward in close contact with the end of hook by means of the spring contained in the recess of the stem, as hereinafter set forth.

Figure 1:
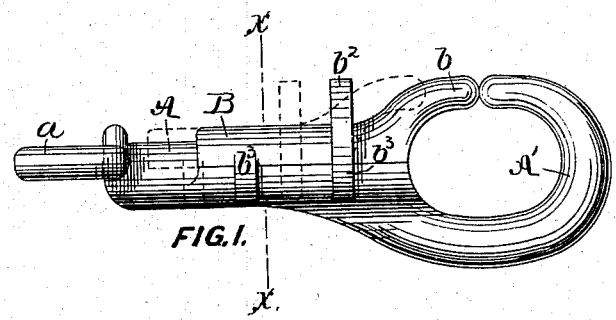
Figure 2:
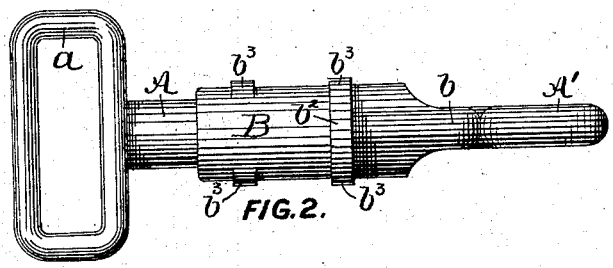
Figure 3:
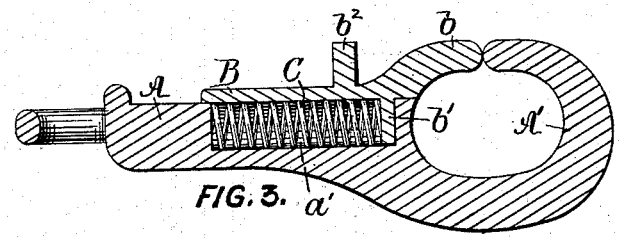
Figure 4:
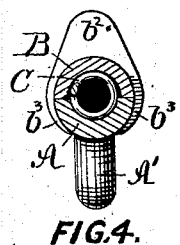

In the accompanying drawings, which form part of this specification, and to which reference is herein made, Figure 1 is a side elevation of my improved snap-hook; Fig. 2, a plan view of same; Fig. 3, a longitudinal section of Fig. 1, and Fig. 4 a transverse section at the line X X of Fig. 1.

As represented in the drawings, my improved snap-hook consists of a metallic cylindrical stem or body, A, provided at one end with a hook, A', and at the opposite end with an eye, $a$, or other suitable means, for attaching the device to a strap, rope, or chain. In the cylindrical stem a recess, $a'$, is formed for the purpose of containing the spiral spring C.

B is a sliding piece, made of malleable metal, fitted to move endwise on the outside of the stem A, and provided with a raised projecting horn, $b$, which abuts against the point of the hook A' and forms a complement to said hook for producing an oval eye. Said sliding piece is also provided with a pendent ear, $b'$, that enters into the forward part of the recess $a'$, and receives the pressure of the spring C to keep the end of the horn $b$ in close contact with the point of the hook A'. A thumb-piece, $b^2$, formed on the upper side of the sliding piece, affords the means for applying the power required for moving said sliding-piece backward against the pressure of the spring C. Clasping arms or clips $b^3$ are cast on the sliding piece B, and are bent around the convex surface of the stem A sufficiently close to retain said sliding piece in place, but allowing it to slide freely endwise on said stem.

My snap-hook is opened, as indicated by the dotted lines in Fig. 1, by applying the requisite pressure against the thumb-piece $b^2$ to force the sliding piece B backward against the pressure of the spring C. When the applied pressure is removed from the thumb-piece $b^2$ the resilient force of the spring C causes the sliding piece B to move forward until the horn $b$ is brought into contact with the end of the hook A', and the several parts are restored to the positions shown in the drawings.

I am aware that in the construction of snap-hooks a longitudinally-sliding piece provided with a projecting point to abut against the end of the hook—the two points being forced in contact by means of a concealed spring—is not new, and therefore I do not wish to be understood as claiming such parts otherwise than in the precise combination specified in the following claim.

I claim as my invention—

In a snap-hook, the combination, with a stem, A, containing a recess, $a'$, and provided with a hook, A', and the spring C, of the sliding piece B, fitted to slide on the outside of the stem A, and provided with a raised projecting horn, $b$, adapted to conjoin to the point of the hook A', and with a pendent ear, $b'$, that enters the recess $a'$, to receive the pressure of the spring C, the said sliding piece being also provided with the clasping arms or clips $b^3$, as and for the purpose herein specified.

JOHN GIBBONS.

Witnesses:
J. H. REYNOLDS,
WM. H. LOW.